United States Patent [19]

Nun et al.

[11] Patent Number: 5,641,830
[45] Date of Patent: Jun. 24, 1997

[54] POLYOXYMETHYLENE WITH IMPROVED RESISTANCE TO ZINC AND/OR COPPER IONS, PROCESS FOR THE PRODUCTION THEREOF AND USE THEREOF

[75] Inventors: Edwin Nun, Brachttal; Stephanie Schauhoff, Frankfurt; Klaus Dorn, Hanau, all of Germany

[73] Assignee: DeGussa Aktiengesellschaft, Germany

[21] Appl. No.: 531,412

[22] Filed: Sep. 21, 1995

[30] Foreign Application Priority Data

Sep. 21, 1994 [DE] Germany .................. 44 33 667.5

[51] Int. Cl.⁶ .................. C08L 59/00; C08L 75/04; C08K 5/13
[52] U.S. Cl. .................. 524/542; 524/323; 524/342; 524/591; 524/843; 524/839; 524/840; 525/399
[58] Field of Search .................. 524/591, 842, 524/843, 839, 840, 323, 342; 525/399; 425/542

[56] References Cited

U.S. PATENT DOCUMENTS

| | | | |
|---|---|---|---|
| 3,204,014 | 8/1965 | Green .................. | 524/512 |
| 4,108,814 | 8/1978 | Reiff et al. .................. | 524/840 |
| 4,331,439 | 5/1982 | Hamada et al. .................. | 8/506 |
| 4,507,431 | 3/1985 | Stutz et al. .................. | 524/840 |

*Primary Examiner*—Andrew E. C. Merriam
*Attorney, Agent, or Firm*—Cushman Darby & Cushman IP Group of Pillsbury Madison & Sutro

[57] ABSTRACT

A polyoxymethylene composition, polyoxymethylene parts, and a process for the production of polyoxymethylene. The polyoxymethylene composition contains one or more polyoxymethylene species, an aqueous anionic polyurethane dispersion, phenolic antioxidant(s), and optionally, colorant, filler, and conventional additives. The composition exhibits improved resistance to non-ferrous metal corrosion.

12 Claims, No Drawings

POLYOXYMETHYLENE WITH IMPROVED RESISTANCE TO ZINC AND/OR COPPER IONS, PROCESS FOR THE PRODUCTION THEREOF AND USE THEREOF

BACKGROUND OF THE INVENTION

1. Field of the Invention

This invention relates to polyoxymethylene with improved resistance to zinc and/or copper ions, to mouldings made therefrom, to a process for the production of polyoxymethylene with improved resistance to zinc and/or copper ions and to the use of polyoxymethylene in contact with corrosive media, for example containing zinc and/or copper ions.

2. Description of the Background Art

Polyoxymethylene (polyacetal) is an outstanding material, from which the most varied practical articles may be produced, in particular by injection moulding. Advantageous properties include in particular chemical resistance to many organic solvents and bases. Since the commercial introduction of polyacetals, many attempts have been made purposefully to improve the properties of polyoxymethylene (POM). Thus, for example, in order to reduce acid lability, which results from unstable semi-acetal end groups on the polyoxymethylene, the polymer end groups have been protected by esterification or etherification (H. Cherdron, L. H ör, W. Kern, *Makromol. Chem.*, 52, 48 et seq. (1962)). It is also known to add thermoplastic polyurethanes in order to improve the impact resistance of POM. However, polyurethanes may also have an acid-stabilising effect at higher contents (DE-PS 11 93 240).

In general, adding thermoplastic polyurethane to polyoxymethylene gives rise to impact resistant polyoxymethylene, as is for example described in EP 0 116 456 B1. POM/TPU moulding compositions are likewise known from DE-OS 37 03 232, in which polyoxymethylene contains 5.3 to 150 parts of a thermoplastic polyurethane and optionally 0.1 to 5 parts, relative to the total quantity of POM+TPU, of alkaline-earth salts of aliphatic mono- to tribasic carboxylic acids with 2 to 20 C atoms, preferably such acids containing hydroxyl groups.

Despite numerous attempts it has, however, hitherto never proved possible to significantly reduce the severe damage caused to polyoxymethylene on contact with zinc and/or copper ions (i.e. so-called non-ferrous metal corrosion). As is known, POM is severely damaged on contact with zinc and/or copper ions. Thus, for example, small standard specimens made from polyoxymethylene immersed in refluxing 0.12 molar zinc chloride solution buffered to pH 5.0 suffer considerable losses of mechanical strength within a few days. Impact testing of such corroded small standard specimens invariably leads to failure before two weeks have passed.

Various additives, such as antioxidants, oxalate, polyethylene glycol or thermoplastic polyurethanes are only capable of slightly retarding non-ferrous metal corrosion under the above-stated test conditions. Thus, for example, the resistance of impact resistant polyoxymethylene, as is known from EP 0 116 456 B1, to zinc and/or copper ions is only slightly improved in comparison with polyoxymethylenes containing no thermoplastic polyurethanes and is in general still unsatisfactory.

SUMMARY OF THE INVENTION

With regard to the stated disadvantages of known prior art polyoxymethylenes, the object of the present invention is to provide a polyoxymethylene, mouldings produced therefrom and a production process for a polyoxymethylene which is rendered resistant to zinc and/or copper ions. The polyoxymethylene should moreover as far as possible retain its original physical properties, such as for example stiffness, toughness, colour.

This object is achieved with regard to the polyoxymethylene with a composition according to claim 1.

It has been established according to the invention that even small quantities of aqueous, anionic polyurethane dispersions are capable of having an extraordinarily advantageous effect on the resistance of POM to non-ferrous metal corrosion. Aqueous anionic polyurethane dispersions may here also be combined with other conventional components which are miscible with polyoxymethylene.

The polyoxymethylene blends with improved non-ferrous metal corrosion which are obtained according to the invention are particularly suitable for applications in which the products are at least occasionally exposed to zinc and/or copper ions, in particular for parts for or complete irrigation units with fertiliser application, dispensing containers of any kind, for example in dishwashers, products for storing or conveying water containing non-ferrous metal ions, components for sanitary applications etc..

The polyoxymethylenes with improved non-ferrous metal corrosion according to the invention contain A at least one polyoxymethylene B at least 0.05 parts by weight, relative to 100 parts by weight of A, of at least one aqueous anionic polyurethane dispersion, C 0.05 to 3 parts by weight, relative to 100 parts by weight of A, of at least one phenolic antioxidant together with D 0 to 10 parts by weight, relative to 100 parts by weight of A, of carbon black or other colorants, E 0 to 50 parts by weight, relative to 100 parts by weight of A, of filler, F conventional additives.

For the purposes of the invention, polyoxymethylenes according to the invention are taken to be compositions which may be obtained by mixing together components A to C and optionally D to F using methods generally known to the person skilled in the art, while one constituent of the compositions is component A, which comprises one or more polyoxymethylenes.

The polyoxymethylenes comprising a principal constituent A of the moulding compositions according to the invention may be homopolymers of formaldehyde or of trioxane or copolymers of trioxane. They may have a linear structure, but may also be branched or crosslinked. They may be used individually or as a mixture.

Homopolymers of formaldehyde or of trioxane are taken to be those polymers, the semi-acetal hydroxyl end groups of which are chemically stabilised, for example by esterification or etherification, against degradation. Copolymers of trioxane are taken to be copolymers prepared from trioxane and at least one composition which may be copolymerised with trioxane.

Such compositions which may be copolymerised with trioxane are, for example, cyclic ethers with 3 to 5, preferably 3 ring members, cyclic acetals other than trioxane, in particular formals with 5 to 11, preferably 5 to 8 ring members and linear polyacetals, in particular polyformals. The stated components are in each case used in quantities of 0.01 to 20, preferably of 0.1 to 10, in particular of 1 to 5 wt. %.

Suitable comonomers are in particular compositions of the formula

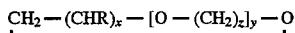

in which R means a hydrogen atom, an alkyl residue with 1 to 6, preferably 1, 2 or 3 carbon atoms, which may be substituted with 1, 2 or 3 halogen atoms, preferably chlorine atoms, an alkoxymethyl residue with 2 to 6, preferably 2, 3 or 4 carbon atoms, a phenyl residue or a phenoxymethyl residue, x is an integer from 1 to 3, wherein y equals zero, y is an integer from 1 to 3, wherein x equals zero and z equals 2 and z denotes an integer from 3 to 6, preferably 3 or 4, wherein x equals zero and y equals 1.

Suitable cyclic ethers are principally epoxides, for example ethylene oxide, styrene oxide, propylene oxide or epichlorohydrin, together with glycidyl ethers of mono- or polyhydric alcohols or phenols.

Suitable cyclic acetals are principally cyclic formals of aliphatic or cycloaliphatic $\alpha,\omega$-diols with 2 to 8, preferably 2, 3 or 4 carbon atoms, the carbon chain of which may be interrupted by an oxygen atom at intervals of two carbon atoms, for example:

glycol formal (1,3-dioxolane), propanediol formal (1,3-dioxane)

butanediol formal (1,3-dioxepane) and diglycol formal (1,3,6-trioxocane) together with 4-chloromethyl-1,3-dioxolane, hexanediol formal (1,3-dioxonane) and butenediol formal (1,3-dioxa-5-cycloheptene).

Diformals, for example diglycerol diformal, are however also suitable, in particular for the production of trioxane terpolymers.

Suitable linear polyacetals are both homo- or copolymers of the above-defined cyclic acetals as well as linear condensation products prepared from aliphatic or cycloaliphatic $\alpha,\omega$-diols with aliphatic aldehydes or thioaldehydes, preferably formaldehyde. Homopolymers of cyclic formals of aliphatic $\alpha,\omega$-diols with 2 to 8, preferably 2, 3 or 4 carbon atoms are in particular used, for example poly-(1,3-dioxolane), poly-(1,3-dioxane) and poly-(1,3-dioxepane).

The values for the viscosity number of the polyoxymethylenes used according to the invention (measured in a solution of the polymer in hexafluoroisopropanol, adjusted to pH 8 to 9 with methanolic sodium hydroxide solution, at 25° C. at a concentration of 0.3 g/100 ml) should generally be at least 160 (ml/g). The crystallite melting points of the polyoxymethylene are within the range from 140° to 180° C., preferably from 150° to 170° C., their densities are 1.38 to 1.45 g×ml$^{-1}$, preferably 1.40 to 1.43 g×ml$^{-1}$ (measured to DIN 53 479).

The preferably binary or ternary trioxane copolymers used according to the invention are produced in a known manner by polymerising the monomers in the presence of cationically active catalysts at temperatures of between 0° and 150° C., preferably of between 70° and 140° C. (c.f. for example DE-AS 14 20 283). The catalysts used here are, for example, Lewis acids, such as boron trifluoride or antimony pentafluoride, and coordination compositions of such Lewis acids, preferably etherates, for example boron trifluoride diethyl etherate or boron trifluoride di-tert.-butyl etherate. Protonic acids are also suitable, for example perchloric acid, together with salt-type compositions, for example triphenylmethyl hexafluorophosphate or triethyl-oxonium tetrafluoroborate, acetyl perchlorate or esters of perchloric acid, for example methoxymethyl perchlorate or tert.-butyl perchlorate. Molecular weight may be controlled by using any substances which are known to act as chain transfer agents during the polymerisation of trioxane. Polymerisation may be performed as bulk, suspension or solution polymerisation. In order to remove any unstable fractions, the copolymers may be subjected to thermally or hydrolytically controlled partial degradation down to the primary alcohol end groups (c.f. for example DE-AS 14 45 273 and 14 45 294).

The homopolymers of formaldehyde or of trioxane used according to the invention are also produced in a known manner by catalytic polymerisation of the monomer (c.f. for example DE-AS 10 37 705 and 11 37 215).

The anionic aliphatic polyurethane dispersions contained in the moulding compositions according to the invention as component B consist of aqueous dispersions with a solids content of between 20 and 60 wt. %. The dispersions may contain an emulsifier, but may also contain no emulsifier. The nature of the cation is immaterial to the present invention, as is whether the dispersion contains carboxylate or sulphonate groups. The dispersed polymers may be polyester polyurethanes or polyester ether polyurethanes. Dispersions of this type are described, for example, in DE 38 36 030 A1, DE 34 15 920 A1, JP 60004515 and EP 54 766 A1.

Due to their particular properties (inter alia excellent resistance to hydrolysis, crosslinkability, mechanical foamability, elevated light-fastness and elevated elasticity), such aqueous anionic polyurethane dispersions have hitherto principally be used in the production of coated textiles, which were used inter alia for outer clothing, purses and similar articles, protective work clothing, shoe upper material or industrial articles (J. Text. Inst., 71 (3), pages 121–28, 1980). The suitability of polyurethane dispersions as a coating composition for various polymeric moulding compositions, including inter alia polyoxymethylene, has moreover also already been described (DE 34 40 534). However, according to DE 34 40 534, this is again a surface treatment and not a constituent of the moulding composition.

Polyurethanes which are soluble or dispersible in water, a process for the production thereof and the use thereof for coating any desired substrates is described in EP 0 269 972 B1.

Products which may be used particularly successfully for the invention are inter alia the leather dressing auxiliaries distributed by the company BASF under the trade name Astacin® (grades: Grund PI, Grund UH, TOP UT, Finish PUD, Finish PUM, Finish UL) and the textile coating dispersions offered for sale by the company Bayer which are commercially available under the trade names Bayderm® Finish 85 UD, IMPRANIL® DLV Dispersion or IMPRANIL® DLN Dispersion W 50.

Surprisingly, it has been found for the purposes of the invention that even small proportions of at least 0.05 parts, relative to the principal quantity of polyoxymethylene, of aqueous anionic polyurethane dispersions bring about an outstanding improvement in the resistance of the polyoxymethylene to zinc and/or copper ions.

There is, in principle, no upper limit to the quantity of aqueous anionic polyurethane dispersion which may be added to the polyoxymethylene. It is, however, preferred that the polyoxymethylene only contains up to 10 parts by weight of the aqueous anionic polyurethane dispersion, relative to 100 parts by weight of A, since, at distinctly higher contents, no further improvement, proportionate to the increasing quantity of the aqueous anionic polyurethane dispersion, may be achieved in the non-ferrous metal corrosion resistance of the polyoxymethylene. The nature of the homogenisation of the moulding compositions according to the invention in particular ensures that the polyoxymethylene is not coated with polyurethane, but that instead the polyurethane is present in the polyoxymethylene in the form of discrete particles. These particles are present as small spheres uniformly distributed in the polyoxymethylene matrix.

In order to provide protection against the harmful action of atmospheric oxygen, in particular at elevated temperatures, the moulding compositions according to the invention must additionally contain as component C 0.05 to 3 parts by weight, relative to 100 parts by weight of polyoxymethylene, of at least one phenolic antioxidant. Preferred phenolic antioxidants are in particular those with 2 to 6 hydroxyphenyl residues per molecule, as are for example described in DE-PS 25 40 207. Without a phenolic antioxidant, polyoxymethylene cannot be processed as a moulding composition and is thus also not extrudable.

The polyoxymethylenes according to the invention may furthermore contain up to 10 parts by weight, relative to 100 parts by weight of polyoxymethylene, of carbon black or other colorants as an optional component D. The carbon black may here be incorporated as a powder, in bead form or as a masterbatch, preferably in a polyoxymethylene matrix. Apart from its colouring action, the carbon black moreover prevents ageing of the polyoxymethylene moulding compositions. Light, in particular the UV fraction of sunlight which reaches the earth, accelerates the ageing of polyoxymethylene moulding compositions. A suitable counter-measure is to reduce, or better still, prevent penetration of the light. Carbon blacks, depending upon their concentration and BET surface area, act as UV stabilisers for polyoxymethylene, often in conjunction with organic UV absorbers.

If only carbon black is used as component D, it is particularly preferred for the moulding composition according to the invention to contain up to 6 parts by weight, relative to 100 parts by weight of A, of carbon black. Up to 6 parts by weight of carbon black are sufficient for known polyoxymethylene moulding compositions.

In order to complement and improve certain mechanical properties, the polyoxymethylenes according to the invention may contain up to 50 parts by weight, preferably up to 30 parts by weight, relative to 100 parts by weight of A, of fillers. These particularly advantageously include glass fibres, as are, for example, described in DE 25 33 087 and JP 86236851; glass beads, as are known from EP 0 273 657; whiskers, as are provided by JP 86060718; chalk according to EP 0 192 356; wollastonite known from EP 0 301 407; or carbon fibres according to JP 91275764.

The moulding compositions according to the invention may contain the stated fillers individually or as a mixture of two or more thereof.

Finally, the moulding compositions may contain further additives conventionally incorporated into polyoxymethylene moulding compositions. Preferred additives are UV absorbers, heat stabilisers, flame retardants and/or acid protection agents used in quantities of up to 3 parts by weight, relative to 100 parts by weight of polyoxymethylene. Examples of such conventional additives are per se known heat stabilisers, for example condensation products of carboxylic acid amides, such as oxalic acid, malonic acid, isophthalic acid, terephthalic acid diamide and trimesic acid triamide, low volatility S-triazine derivatives, such as Melam, Melem and Melon, condensation products prepared from melamine and formaldehyde, and UV absorbers and light stabilisers, for example 2-(2'-hydroxyphenyl)-benzotriazoles, 2,4-bis-(2'-hydroxyphenyl)-6-alkyl-S-triazines, 4-hydroxybenzophenones, 1,3-bis-(2'-hydroxybenzoyl)benzene derivatives and oxalic acid diamides, such as oxalic acid dianelide.

As already mentioned, the polyoxymethylene stabilised against non-ferrous metal corrosion may be used wherever there is direct contact with zinc, copper or brass components. Such applications are in particular in the heating and sanitary sectors, but also in the automotive sector and in devices for applying fertilisers. In order to assess the degree of stabilisation of the components B used in the polyoxymethylene according to the invention, a so-called non-ferrous metal corrosion test was used. For this purpose, small standard specimens were first produced from polyoxymethylene, wherein crude polyoxymethylene is extruded in a ZSK 28 (twin screw coextruder) under conventional conditions with additives. The strands leaving the extruder are cooled by being passed through cold water and are then pelletised. Compression moulded sheets of dimensions 15.8 cm×15.8 cm×0.2 cm are compression moulded at 190° C. from the dried pellets, from which sheets test pieces corresponding to small standard specimens to DIN 16 781, part 2 are produced. In the non-ferrous metal corrosion test, the resultant small standard specimens are boiled at 100° C. in a refluxing 0.12 molar zinc chloride solution buffered to a pH value of 5. Each 100 ml of the buffer solution to establish the pH value of 5.0 consists for this purpose of 67.8 ml of a 0.1 normal acetic acid and 32.2 ml of a 0.1 normal sodium acetate solution. The small standard specimens are immersed in this solution in such a manner that they are completely covered by the zinc chloride solution. At 24 hour intervals, 10 small standard specimens are removed and the removed test pieces are then washed with deionised water and dried in air at room temperature. The impact strength of the washed and dried small standard specimens is then tested to DIN 53 453. If fewer than 3 of the 10 removed small standard specimens fail in the impact strength test, a further 10 small standard specimens are removed 24 hours after the previous 10 specimens, washed, dried and tested for impact strength. This procedure is repeated until at least 3 small standard specimens fail in the impact strength test. The mechanical properties are then considered to have failed. The times, measured in days, after which at least 3 small standard specimens fail, are compared with each other.

The polyoxymethylene blends according to the invention advantageously and preferably resist the non-ferrous metal corrosion test for longer than 20 days, particularly advantageously for longer than 25 days and very particularly advantageously for longer than 30 days, wherein, as already mentioned, the non-ferrous metal corrosion test has the following stages:

a) immersion of test pieces at 100° C. in a 0.12M zinc chloride solution buffered to pH 5;

b) removal of 10 test pieces at 24 hour intervals, washing thereof with deionised water and drying in air at room temperature;

c) determination of impact strength of test specimens to DIN 53 453;

d) establishing the period of immersion after which at least 3 test pieces fail in the impact test.

The moulding compositions according to the invention are produced by mixing the components, which are conveniently predominantly in powder or pellet form, and subsequent homogenisation. Component B, optionally together with further components, are however added in dispersed form or the further components are added in solution, either in the mixer or not until the homogenising apparatus.

Mixing is conventionally performed at room temperature, preferably at a temperature of 15° to 30° C., and homogenisation proceeds in any desired heatable mixing unit, for example roll mills, calenders, kneaders or extruders at a temperature above the crystallite melting point of the polyoxymethylene, i.e. at a temperature of 150° to 260° C., preferably of 170° to 220° C.

The polyoxymethylene blends according to the invention are preferably processed into mouldings, inter alia advantageously by injection moulding, wherein the injection moulded parts contain at least one polyoxymethylene together with 0.1 to 10 parts by weight, relative to 100 parts by weight of the polyoxymethylene, of an aqueous anionic polyurethane dispersion.

The present invention also relates to a process for the production of a polyoxymethylene with improved resistance to zinc and/or copper ions, in which A 100 parts by weight of at least one polyoxymethylene are mixed with B 0.1 to 10 parts by weight of an aqueous anionic polyurethane dispersion, wherein the polyurethane dispersion may comprise both polyester polyurethanes and polyester ether polyurethanes, with or without emulsifiers, with carboxylate or sulphonate groups with identical or different counterions, C 0.05 to 3 parts by weight of at least one phenolic antioxidant together with D 0 to 10 parts by weight of carbon black or other colorants, E 0 to 50 parts by weight of fillers and F up to 3 parts by weight of further additives conventionally used in polyoxymethylene moulding compositions, and are optionally compression moulded or injection moulded into moulded parts.

The non-ferrous metal corrosion resistance of the products produced in this manner may be determined as described above.

The present invention also relates to the use of 0.1 to 10 parts by weight of an aqueous, anionic polyurethane dispersion (B) and 0.05 to 3 parts by weight of at least one phenolic antioxidant (C), 0 to 10 parts by weight of carbon black or other colorants (D), 0 to 50 parts by weight of fillers (E) and optionally conventional additives (F)

per 100 parts by weight of at least one polyoxymethylene (A) in order to improve resistance to zinc and/or copper ions.

The above-stated particular ranges for the added components also apply to the process and the use. In particular, the stated aqueous anionic polyurethane dispersions are subject to no further restrictions.

The invention is described in greater detail in the following examples.

DETAILED DESCRIPTION OF THE INVENTION

Description of starting substances

Materials used

Polyoxymethylene (POM):

Copolymer prepared from trioxane with 1,3-dioxacycloheptane with a comonomer content of approximately 2.5%, already stabilised with approximately 0.3% of triethylene glycol bis-(tert.-butyl-5-methyl-4-hydroxyphenyl)propionate as antioxidant and a finely divided, crosslinked melamine/formaldehyde condensation product.

MFI: 8–10 g/10 minutes.

Polyurethane dispersion 1 (PU-Disp 1):

Anionic aliphatic polyester ether polyurethane dispersion, approximately 40% in water, pH value 6.5 to 7.5, viscosity to DIN 53 211:15–30s/25° C. (drain cup, 4 mm nozzle).

Polyurethane dispersion 2 (PU-Disp 2):

Anionic, aliphatic polyester polyurethane dispersion, approximately 50% in water, pH value 6.5 to 7.5, viscosity to DIN 53 211:25–30 s/20° C. (drain cup, 4 mm nozzle).

Polyurethane dispersion 3 (PU-Disp 3):

Emulsifier-free, anionic, aliphatic polyester polyurethane dispersion with carboxylate groups, approximately 40% in water, pH value 6.0 to 8.0, viscosity to DIN 53 211:10–30s/25° C. (drain cup, 4 mm nozzle).

Comparative Test a) and Examples 1–6

The components POM, PU-Disp 1, PU-Disp 2 and PU-Disp 3 were mixed in the weight ratios, in each case relative to POM, stated in Table 1, melted and homogenised in a model ZDS-K28 twin screw extruder and the homogenised mixture was pelletised. Small standard specimens were produced as described above from the pellets and tested for resistance to zinc ions. The results are summarised in Table 1.

TABLE 1

| Comparative test/ Example | PU-Disp 1 (%) | PU-Disp 2 (%) | PU-Disp 3 (%) | Failure after days |
|---|---|---|---|---|
| a) | 0 | 0 | 0 | 15 |
| 1 | 1 | 0 | 0 | 24 |
| 2 | 2 | 0 | 0 | >36 |
| 3 | 0 | 1 | 0 | 24 |
| 5 | 0 | 0 | 1 | 27 |
| 6 | 0 | 0 | 2 | >36 |

Further embodiments and uses of the polyoxymethylene moulding compositions together with further developments of the process according to the invention may be found in the following patent claims.

What is claimed is:

1. A polyoxymethylene composition with improved resistance to zinc and/or copper ions, said polyoxymethylene composition comprising at least one species of polyoxymethylene, and by weight:

at least 0.05 parts of an aqueous anionic polyurethane dispersion, 0.05 to 3 parts of at least one phenolic antioxidant, 0 to 10 parts of carbon black or other colorant, and 0 to 50 parts of filler, per 100 parts of polyoxymethylene.

2. A polyoxymethylene composition according to claim 1, containing by weight up to 10 parts of an aqueous anionic polyurethane dispersion per 100 parts of polyoxymethylene.

3. A polyoxymethylene composition according to claim 1 or 2, containing by weight up to 6 parts of carbon black or other colorant per 100 parts of polyoxymethylene.

4. A polyoxymethylene composition according to claim 1 or 2, additionally comprising by weight up to 30 parts of chalk, glass fibres, glass beads, wollastonite and/or potassium titanate whiskers per 100 parts of polyoxymethylene.

5. A polyoxymethylene composition according to claim 3, additionally comprising by weight up to 30 parts of chalk, glass fibres, glass beads, wollastonite and/or potassium titanate whiskers per 100 parts of polyoxymethylene.

6. A polyoxymethylene composition according to claim 1 or 2, additionally comprising UV absorbers, heat stabilisers, flame retardants and/or acid protection agents.

7. A polyoxymethylene composition according to claim 5, additionally comprising UV absorbers, heat stabilisers, flame retardants and/or acid protection agents.

8. A polyoxymethylene composition according to claim 1 or 2 which is resistant for longer than 20 days in the non-ferrous metal corrosion test, wherein the non-ferrous metal corrosion test consists of the following steps:

a) immersing test pieces at 100° C. in a 0.12M zinc chloride solution buffered to pH 5;
   b) removing 10 test pieces after each 24 hour interval, washing the pieces with deionised water and drying in air at room temperature;
   c) determining impact strength of test specimens to DIN 53 453;
   d) establishing the period of immersion after which at least 3 test pieces fail in the impact test c).

9. Mouldings made from a polyoxymethylene composition according to claim 1 or 2.

10. Process for the production of a polyoxymethylene composition with improved resistance to zinc and/or copper ions, comprising mixing:

a) 100 parts by weight of at least one species of polyoxymethylene;
    b) 0.1 to 10 parts by weight of an aqueous anionic polyurethane dispersion, wherein the polyurethane dispersion is selected from the group consisting of polyurethane dispersions comprising polyester polyurethanes, polyurethane dispersions comprising polyester ether polyurethanes, polyurethane dispersions comprising emulsifiers, polyurethane dispersions without emulsifiers, polyurethane dispersions comprising emulsifiers with carboxylate groups, polyurethane dispersions comprising emulsifiers with sulphonate groups, polyurethane dispersions comprising emulsifiers with a single counterion and polyurethane dispersions comprising emulsifiers with different counterions;
    c) 0.05 to 3 parts by weight of at least one phenolic antioxidant;
    d) 0 to 10 parts by weight of carbon black or other colorant;
    e) 0 to 50 weight of filler; and
    f) up to 3 parts by weight of additives conventionally used in polyoxymethylene moulding compositions.

11. The process according to claim 10, additionally comprising the step of compression moulding or injection moulding the polyoxymethylene composition into a moulded part.

12. The process according to claim 10, in which the aqueous anionic polyurethane dispersion, phenolic antioxidant(s), and optionally the colorant, filler, and additives, are added to the polyoxymethylene in a quantity such that a test piece obtainable from the moulding composition is resistant in the non-ferrous metal corrosion test for longer than 20 days, wherein the non-ferrous metal corrosion test consists of the following steps:

a) immersing test pieces at 100° C. in a 0.12M zinc chloride solution buffered to pH 5;
    b) removing 10 test pieces after each 24 hour interval, washing the test pieces with deionised water and drying in air at room temperature;
    c) determining of impact strength of test specimens to DIN 53 453;
    d) establishing the period of immersion after which at least 3 test pieces fail in the impact test c).

* * * * *